(12) United States Patent
Mody et al.

(10) Patent No.: US 8,170,152 B2
(45) Date of Patent: May 1, 2012

(54) METHOD AND APPARATUS FOR MULTIPLE SIGNAL IDENTIFICATION AND FINDING THE BASIS FUNCTIONS OF THE RECEIVED SIGNAL

(75) Inventors: Apurva N Mody, Lowell, MA (US); Paul D Fiore, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 613 days.

(21) Appl. No.: 12/439,168

(22) PCT Filed: Jul. 11, 2008

(86) PCT No.: PCT/US2008/069742
§ 371 (c)(1),
(2), (4) Date: Feb. 27, 2009

(87) PCT Pub. No.: WO2009/009715
PCT Pub. Date: Jan. 15, 2009

(65) Prior Publication Data
US 2010/0002816 A1 Jan. 7, 2010

Related U.S. Application Data

(60) Provisional application No. 60/959,204, filed on Jul. 12, 2007.

(51) Int. Cl.
*H04L 27/06* (2006.01)
(52) U.S. Cl. ........ 375/340; 375/136; 375/147; 375/260; 375/316; 375/350; 370/210; 370/480

(58) Field of Classification Search .................. 375/136, 375/147, 260, 316, 340, 350; 370/210, 480
See application file for complete search history.

(56) References Cited

U.S. PATENT DOCUMENTS

| | | | |
|---|---|---|---|
| 6,697,633 B1 | 2/2004 | Dogan et al. | |
| 6,822,606 B2 * | 11/2004 | Ponsford et al. | ............. 342/192 |
| 2003/0081804 A1 | 5/2003 | Kates | |
| 2006/0030318 A1 | 2/2006 | Moore et al. | |
| 2006/0097730 A1 | 5/2006 | Park et al. | |
| 2007/0211786 A1 * | 9/2007 | Shattil | ........................ 375/141 |

OTHER PUBLICATIONS

PCT Search Report dated Oct. 22, 2008 of Patent Application No. PCT/US2008/069742 filed Jul. 11, 2008.
Real, E.C. et al., "Two Algorithms for Fast Approximate Subspace Tracking", IEEE Transactions on Signal Processing, Jul. 1999, 10 pages, vol. 47, No. 7.

\* cited by examiner

*Primary Examiner* — Leon Flores
(74) *Attorney, Agent, or Firm* — David A. Rardin; Maine Cernota & Rardin; Daniel J. Long

(57) ABSTRACT

A method is disclosed to detect a broad class of signals in Gaussian noise using higher order statistics. The method detects a number of different signal types. The signals may be in the base-band or the pass-band, single-carrier or multi-carrier, frequency hopping or non-hopping, broad-pulse or narrow-pulse etc. In a typical setting this method provides an error rate of 3% at a signal to noise ratio of 0 dB. This method gives the time frequency detection ratio which may be used to determine if the detected signal falls in Class Single-Carrier of Class Multi-Carrier. Additionally, this method may be used for a number of different applications such as multiple signal identification, finding the basis functions of the received signal.

36 Claims, 11 Drawing Sheets

900

METHOD AND APPARATUS FOR MULTIPLE SIGNAL IDENTIFICATION AND FINDING THE BASIS FUNCTIONS OF THE RECEIVED SIGNAL

RELATED APPLICATIONS

This application claims the benefit of U.S. Provisional Application No. 60/959,204, filed Jul. 12, 2007; this application is herein incorporated in its entirety by reference.

STATEMENT OF GOVERNMENT INTEREST

This invention was made with United States Government support under Contract No. W15P7T-05-C-P033 awarded by the Defense Advanced Research Projects Agency (DARPA). The United States Government has certain rights in this invention.

FIELD OF THE INVENTION

The invention relates to signal detection and more particularly to efficient detection methods for signal detection using higher-order statistics.

BACKGROUND OF THE INVENTION

Numerous applications in telecommunications and signal processing require an estimation of the number of different signal types that are present in the ambient environment. Once an estimation of the number of different signal types has been carried out, it is useful to identify the basis functions for these signals. A basis is a minimal set of vectors that, in a linear combination, can represent every vector in a vector space such that no element of the basis set can be represented as a linear combination of the other vectors in the basis set. A basis function is an element of the basis for a function space. Each function in the function space can be represented as a linear combination of the basis functions. A typical example of the basis function identification is the estimation of the spreading sequence in a direct sequence spread spectrum (DSSS) signal also termed as code division multiplexing (CDMA).

Another area that requires these capabilities is the cognitive radio application. Cognitive radios can enhance commercial and military communication systems by doing away with the need for comprehensive frequency planning. A cognitive radio may sense its environment, make decisions on the types of signals present; learn the patterns and choose the best possible method of transmitting information. They may be situation aware, and capable of making decisions to ensure error-free and smooth transfer of bits between users. Cognitive radios may, for example, be based on software defined radio (SDR) platforms and attempt to understand not only what users want but also what the surrounding environment can provide. In essence, cognitive radios detect the user's communication needs, and dynamically find the resources that meet those needs. The simplest form of a cognitive radio identifies a given spectrum as empty or unused. This unused spectrum is also known as white space. The cognitive radio then tries to utilize this white space for the user's communications need. More sophisticated cognitive radios detect not just the white space but also the gray space. Gray space is defined as a space which is partially occupied, but there is still some room for more signals to be transmitted without interfering with the existing signals. A sophisticated cognitive radio utilizes the Gray as well as White space in the time, frequency (spectrum), space, code and location domains.

As telecommunications equipment evolves in capability and complexity, and multiple-input and multiple-output (MIMO) systems push the system throughput, cognitive radios are expected to be commonplace in the market. A first step for cognitive radio is to understand the surrounding environment and to detect the ambient signals that are present. A typical procedure is to collect the signal from the surrounding environment and to identify whether it represents some meaningful information or just noise.

The methods suggested previously for multiple signal identification are cumbersome to implement in practice. For example, the algorithm suggested in E. C. Real, D. W. Tufts, and J. W. Cooley, "Two Algorithms for Fast Approximate Subspace Tracking" *IEEE Transactions On Signal Processing*, Vol. 47, No. 7, July 1999, may be used to find the basis functions, however since no synchronization is carried out, it may not be possible to estimate the basis functions.

A need therefore exists for an improved method of multiple signal identification and finding the basis functions of the received signal.

BRIEF SUMMARY OF THE INVENTION

Embodiments of the present invention address this first step of signal detection in the presence of additive white Gaussian noise (AWGN) using higher order statistics (HOS). Instead of calculating the tri-spectrum of the received signal which is a cumbersome task, this method uses the spectrogram of the signal-only segments which is much more easily computable and provides simplicity and efficiency. Additionally, synchronization of the received signal ensures accurate alignment of the columns in the singular value decomposition (SVD) resulting an improved estimation of the basis functions of the received signals.

Embodiments include a method for signal identification comprising the steps of receiving a waveform; converting the waveform to time samples; dividing the waveform time samples into segments; detecting at least one signal for each of the segments; classifying the segments as belonging to signal or noise; identifying a plurality of signals detected based on singular value decomposition of a specific arrangement of signal-only segments; and identifying the at least one signal wherein vectors corresponding to dominant singular values of the at least one received signal correspond to basis functions, the basis functions designating signal type. The time samples may be digital or discrete. The method of detecting a signal may include energy detection, spectral correlation, cyclostationarity check, and application of higher order statistics. In embodiments, the signal may be analog, digital, discrete time, or complex. Detecting the signal may comprise dividing the received waveform into real and imaginary components and detecting the real components and the imaginary components separately. It also may include detecting the signal in base band or pass band.

Detecting the signal may comprise obtaining a compressed spectrogram of signal-only segments of the received waveform. The step of detecting the signal may include taking a first singular value decomposition (SVD) of the compressed spectrogram to obtain a singular value distribution, whereby a number of dominant singular values determines a number of signals present in the received waveform. The principal component analysis (PCA) may be carried out instead of SVD, whereby a number of dominant Eigenvalues determines a number of signals present in the received waveform.

In other embodiments, finding the basis functions of the signal comprises subjecting a time-synchronized matrix to a second singular value decomposition (SVD), producing a matrix whose diagonal elements correspond to singular values of the signal and columns of the U output matrix correspond to basis vectors of at least one detected signal. Finding the basis functions may also comprise subjecting a time-synchronized matrix to a second principal component analysis (PCA), producing a matrix whose diagonal elements correspond to Eigenvalues of the detected signal and columns of an other output matrix correspond to basis vectors of the detected signal. Also, identifying a signal may comprise a threshold derived form normalized singular values such that the highest singular value has an amplitude of unity. The basis functions may be determined by estimating the cyclostationarity of the received waveform and forming columns of signal-only segments such that a length of each column is equal to an estimated time period, forming a time-synchronized matrix of signal-only segments. A time frequency detection ratio (TFDR) may determine whether the signal is single-carrier or multi-carrier. Identification of types of signals may use a compressed spectrogram based on the TFDR carried out in time (TD) and frequency (FD) domains.

Signal types may comprise base-band, pass-band, single-carrier, multi-carrier, frequency-hopping, broadband, narrow-band, broad-pulse, and narrow-pulse. The basis functions in the frequency domain (FD) may be used to re-construct a signal.

The basis functions in the frequency domain (FD) may be used to learn frequency domain patterns of the at least one signal and re-construct them. They may also be used to learn frequency domain patterns of the signals and create new signals whose spectral content does not interfere with the spectral content of those signals.

Basis functions may be obtained in the space domain by performing a singular value decomposition (SVD) of spatial components of the signal. Finding basis functions in the location domain (LD) may consist of detection of the signal at a particular location followed by subjecting a time-synchronized matrix of signal-only segments to singular value decomposition (SVD). Basis functions may be obtained in time (TD), code (CD), space (SD), location (LD), and frequency domains. The basis functions in the frequency domain (FD) may use a compressed spectrogram. The basis functions may be used to re-construct the signal. The basis functions may also be used to find another set of signals that do not interfere with signals that are present in the environment.

Additional embodiments include a wireless communication system comprising a signal detection module wherein signals are detected; and a signal identification module whereby basis functions of the detected signals are determined. The signal detection module's method of detection may include energy detection, spectral correlation, cyclostationarity checking, and application of higher order statistics. The signal detection module may also divide a detected signal into real and imaginary components and detect the real and imaginary components separately. The signal detection module may also obtain a compressed spectrogram of signal-only segments of a detected signal. A first singular value decomposition (SVD) of the compressed spectrogram may be taken to obtain a singular value distribution, whereby a number of dominant singular values determines a number of signals present in a received signal.

A first Eigenvalue decomposition through principal component analysis (PCA) of the compressed spectrogram may be taken to obtain an Eigenvalue distribution whereby a number of dominant Eigenvalues determines the number of signals present in a received signal. The signal identification module may also subject a time-synchronized matrix to a second singular value decomposition (SVD), producing a matrix whose diagonal elements correspond to singular values of a detected signal.

The signal identification module may subject a time-synchronized matrix to a second principal component analysis (PCA), producing a matrix whose diagonal elements correspond to Eigenvalues of a detected signal. The signal identification module may also comprise a threshold derived from normalized singular values such that the highest singular value has an amplitude of unity.

In embodiments, basis functions are determined by estimating cyclostationarity and forming columns of signal-only segments such that a length of each column is equal to an estimated time period.

In yet further embodiments, the system may comprise a cognitive radio.

Another embodiment includes a computer-readable medium having computer-readable signals stored thereon that define instructions that, as a result of being executed by a computer, instruct the computer to perform a method of receiving communications identifying multiple communication signals and signal basis functions, the method comprising receiving a signal; obtaining a compressed spectrogram of the received signal; obtaining a first singular value distribution (SVD) of the compressed spectrogram; determining a number of dominant singular values from the first SVD; identifying a number of signals present in the received signal from the number of dominant singular values; finding signal-only segments of the received signal; estimating cyclostationarity inherent within the signal-only segments; forming time-synchronized signal-only columns of the signal-only segments wherein a length of each column is equal to the signal-only column's estimated time period; forming a time-synchronized matrix of the time-synchronized signal-only columns; subjecting the time-synchronized matrix to a second SVD; and obtaining basis functions of the received signal from the second SVD of the time-synchronized matrix, the basis functions corresponding to the number of dominant singular values whereby signal types are identified.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Embodiments address the problems of multiple signal identification and finding the basis functions of the received signals.

Figure 1:
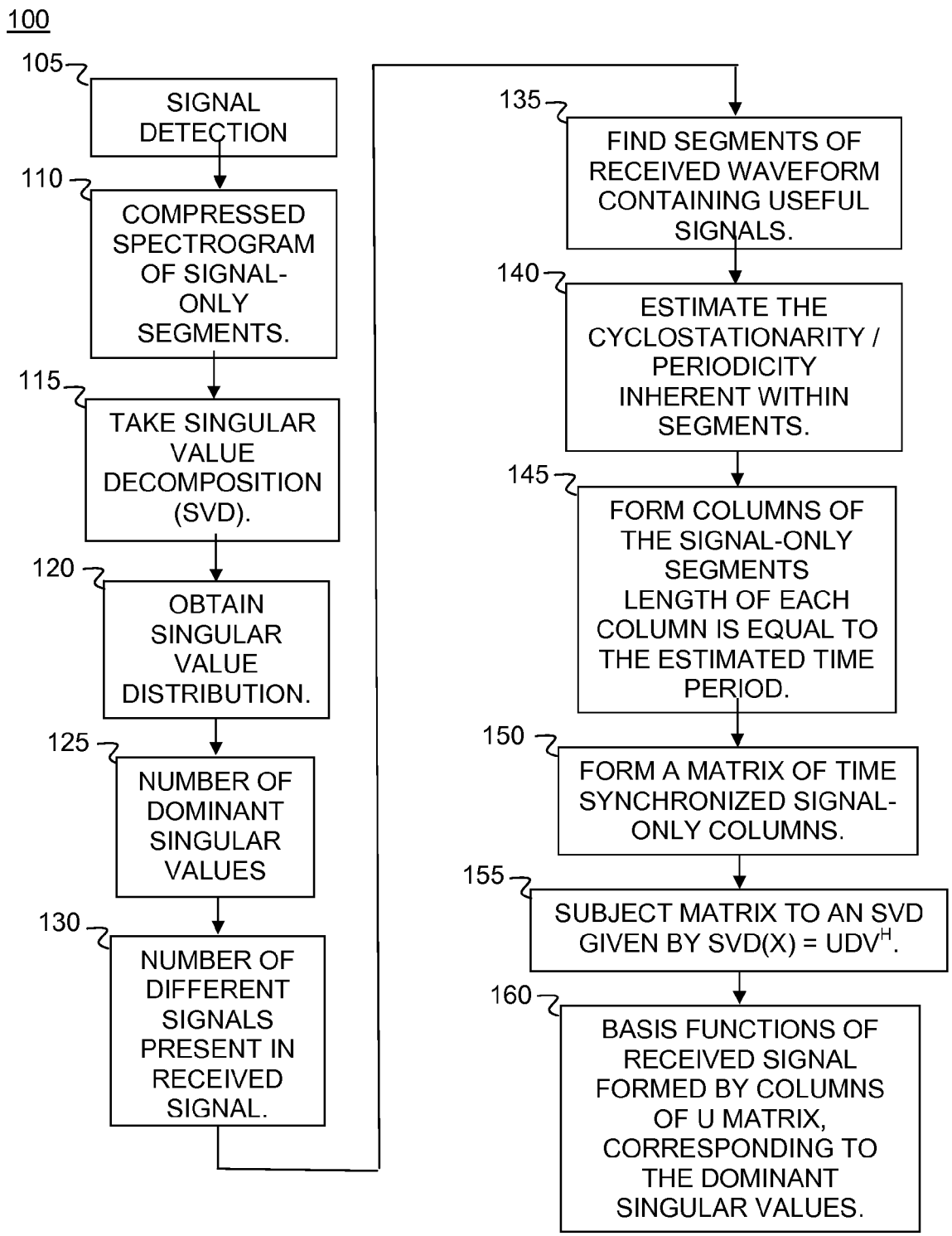
FIG. 1 is a simplified flow chart of the method for multiple signal identification and finding the basis functions of the received signal configured in accordance with one embodiment.

FIG. 1 depicts a simplified flow chart 100 of a method for multiple signal identification which requires far less computation as compared to traditional techniques. After signal detection 105, a compressed spectrogram of the signal-only segments of the received waveform 110 is obtained and the singular value decomposition (SVD) of it is taken 115 to obtain the singular value distribution 120. The number of dominant singular values 125 determines the number of different signals that are present in the received signal 130. For finding the basis functions, embodiments find only those segments of the received waveform that contain the useful signals 135 and estimate the cyclostationarity (a signal with statistical properties that vary cyclically over time) or periodicity inherent within them 140. Note that when cyclostationarity is specified, periodicity is included. Once the estimates of the periodicity have been computed, columns of the signal-only segments are formed such that the length of each column is equal to the estimated time period 145. These time-synchronized signal-only columns then form a matrix 150 which is once again subjected to an SVD given by SVD(X)=UDV$^H$ 155. The columns of the U matrix, corresponding to the dominant singular values form the basis functions of the received signal 160.

More detail will be presented for the components of the methods, including higher order statistics and signal detection.

I. Higher Order Statistics as Non-Gaussian Qualifiers

There are a number of ways in which a useful, information bearing, signal can be detected from additive noise. Some of these methods are: 1) Energy detection, 2) Spectral correlation, 3) Checking for cyclo-stationarity of the received waveform, 4) Use of higher order statistics, etc. The method and system of multiple signal identification and finding the basis functions requires signal detection as its first step. As an illustration, we use a higher order statistics based signal detection method here but any of the above techniques may be used.

It is known that the higher order cumulants for a Gaussian process are zero. Cumulants are defined as the multiplicative coefficients for each term of the Taylor series expansion of the logarithm of the characteristic function. The characteristic function of $\psi_X(\omega)$ of a random variable X is defined as $$\psi_X(\omega)=E\{\exp(j\omega X)\}, \quad (1)$$

where $j=\sqrt{-1}$. The natural logarithm of the characteristic function is defined as the cumulant generating function $$C_X(\omega)=\log\{\psi_X(\omega)\}, \quad (2)$$

or in other words, $$\exp\{C_X(\omega)\}=\psi_X(\omega). \quad (3)$$

Expanding both sides of the equation in a series form results in the following equality.

$$\exp\left\{c_1(j\omega)+c_2\frac{(j\omega)^2}{2!}+\ldots+c_n\frac{(j\omega)^n}{n!}\right\}= \quad (4)$$

$$1+j\omega E[X]+\frac{(j\omega)^2}{2!}E[X^2]+\ldots+\frac{(j\omega)^n}{n!}E[X^n],$$

where $c_1, c_2 \ldots c_n$ are the cumulants of the random process and $E[X]=m_1, E[X^2]=m_2, \ldots E[X^n]=m_n$ are the moments of the random process. When both the sides of the equations are expanded and the powers compared, we can obtain the relationship between the moments and the cumulants of the random process. Let $c_r=r^{th}$ order cumulant of x. Then the relationship between cumulants and the moments may be used to compute the higher order cumulants in a simple fashion as $$c_n = m_n - \sum_{k=1}^{n-1}\binom{n-1}{k-1}c_k m_{n-k} \quad (5)$$

where $$\binom{n-1}{k-1} = \frac{(n-1)!}{(k-1)!\cdot(n-k)!},$$

and $$y! = \text{Factorial}(y) = y\cdot(y-1)\cdot(y-2)\cdot(y-3)\ldots 2\cdot 1$$

The Equation 5, when expanded can be written as follows:

$$c_1 = m_1 \quad (6)$$

$$c_2 = m_2 - m_1^2$$

$$c_3 = m_3 - 3m_1 m_2 + 2m_1^3$$

$$c_4 = m_4 - 4m_1 m_3 - 3m_2^2 + 12m_1^2 m_2 - 6m_1^4$$

$$\vdots$$

Since we need to extract these statistics of the random process from the collected waveforms, after sampling the waveforms, we divide them into segments of length N and place them in vectors x. We then estimate the higher order moments for each of the segments using the following approximation $$\hat{m}_r = \frac{1}{N}\sum_{n=0}^{N-1}(x_n - \bar{x})^r \qquad (7)$$

where $\hat{m}_r$ is the estimate of the $m^{th}$ order moment of the collected waveform samples, and $\bar{X}$ is the mean value for the N given samples of data defined as $$\bar{x} \approx \frac{1}{N}\sum_{n=0}^{N-1} x_n \qquad (8)$$

Using the relationship between the moments and the cumulants of the random process (5 or 6), one can then estimate the cumulants for the received signal samples.

II. Method Flow

Since the cumulants are computed from the estimates of the moments for every segment of duration N, the longer the segment, the better are the statistics and the better the estimation. In practice, however, it is not possible to keep N to be extremely large and it is limited by the duty cycle of the signal itself, and the rate at which the signal changes. This means that even if the received waveform belongs to Class Noise, it is possible that the cumulants may be non-zero. Hence, instead of making a hard decision, we define a probability $P_{Signal}$ that a certain segment belongs to the Class Signal. We also define a threshold which, when exceeded, increases the probability that the received waveform falls into Class Signal, and when the threshold is not exceeded, it decreases the probability that the waveform falls into the Class Signal. The method for this is as follows:

A. Signal or Noise Classification Method

Let R be the number of cumulants of the order greater than two available for computation, and choose some $0<\delta<1$. In this embodiment we let $$\delta = \frac{0.5}{R}.$$

Let $P_{Signal}=0.5$ and choose some $\gamma \in$ {Some positive real number, typically 1, 2, . . . etc.}. Compute all the R+2 moments and cumulants.

1. for r=2 to (R+2);
  if $|c_r|<\gamma|m_2|^{r/2}$, then $P_{Signal}=P_{Signal}-\delta$,
  else if $|c_r|\geq\gamma|m_2|^{r/2}$, then $P_{Signal}=P_{Signal}+\delta$
  end
2. If $P_{Signal}\geq 0.5$ then x belongs to Class Signal,
3. If $P_{Signal}<0.5$ then x belongs to Class Noise.

The parameter $\gamma$ is used to control the probability of false alarm ($P_{FA}$) and the probability of detection ($P_D$). At low values of $\gamma$, $P_{FA}$ is high and $P_D$ is low, whereas, as $\gamma$ increases, $P_{FA}$ falls and $P_D$ increases. For most cognitive radio applications, higher false alarms are tolerable as long as all the signals that are present are detected accurately. It must be noted that if the received waveforms segments are complex, then they are first divided into their real and imaginary parts and processed using the signal detection method separately.

Figure 2:
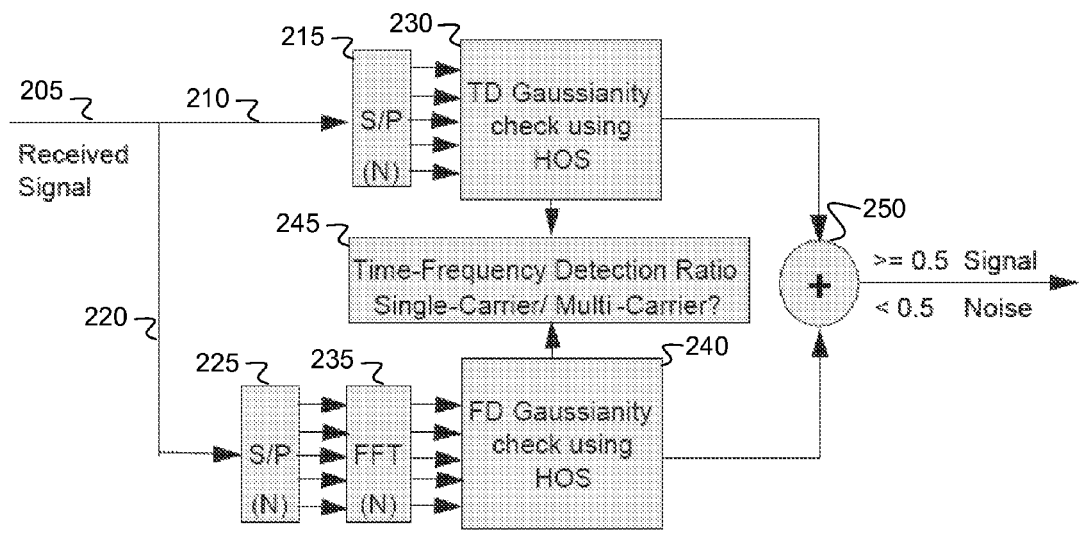
FIG. 2 is a schematic block diagram of the signal or noise identification method in accordance with one embodiment.

FIG. 2 is a schematic block diagram 200 of the signal or noise identification method in accordance with one embodiment. Received Signal 205 is applied by time domain path 210 to serial-to-parallel (S/P) (length–N) 215 and by frequency domain path 220 to S/P (N) 225. S/P (N) 215 output is applied to time domain (TD) Gaussianity check using HOS 230. S/P (N) 225 is applied to a fast Fourier transform (FFT) (length N) 235. FFT (N) 235 output is applied to frequency domain (FD) Gaussianity check using HOS 240. Outputs of FD Gaussianity check using HOS 230 and TD Gaussianity check using HOS 240 are applied to Time-Frequency Detection Ratio Single-Carrier/Multi-Carrier 245. Additionally, outputs of TD Gaussianity check using HOS 230 and FD Gaussianity check using HOS 240 are applied to summing node 250. Output of summing node 250 is considered to be a signal if it is greater than or equal to 0.5 and noise if less than 0.5.

B. Detection of a Broad Class of Signals

Many types of information-bearing signals show a Gaussian distribution in the time domain whereas in the frequency domain they are non-Gaussian. For example, the amplitude distribution of a direct sequence spread spectrum (DSSS) signal in the time-domain is non-Gaussian. On the other hand, the amplitude distribution of the multi-carrier signal samples, such as orthogonal frequency division multiplexing (OFDM) in the time-domain is Gaussian, but the distribution of its complex samples in the frequency domain is not.

Hence in order to be able to detect all of these signal types, we apply the method in time as well as in the frequency domains as shown in FIG. 2. The received waveform samples are divided into segments of length N, and are sent to two different branches. One detects the presence of the signal in the time domain and the other in the frequency domain. Frequency domain detection is performed by first taking Fourier transform of each of the segments as $$X_k = \frac{1}{\sqrt{N}}\sum_{n=0}^{N-1} x_n \exp\left\{-j\frac{2\pi nk}{N}\right\}, k = 0, 1, \ldots, N-1, \qquad (9)$$

The samples $X_k$s are converted to vectors X and sent to the signal detection method. The output probabilities originating from the time-domain (TD) detection and the frequency-domain (FD) detection are weighted equally or un-equally and added together and if the net value is greater than or equal to 0.5, then the received waveform segment falls into Class Signal, otherwise it is falls into Class Noise. It must be noted that if the received waveforms segments or their Fourier transforms are complex, then they are first divided into their real and imaginary parts and processed using the signal detection method separately.

III. Applications of Signal Detection Methods

A. Time Frequency Detection Ratio and Single-Carrier, Multi-Carrier Method Testing The time frequency detection ratio (TFDR) as the name suggests, denotes the ratio of the number of segments detected in the time domain to the number of segments detected in the time and the frequency domain over a particular length of time. Hence, $$TFDR = \frac{N_{TD}}{N_{TD} + N_{FD}}$$

Where $N_{TD}$ is the number of segments detected in the time-domain and $N_{FD}$ is the number of segments detected in the frequency domain. As previously suggested, a single-carrier waveform such as DSSS shows a non-Gaussian amplitude distribution of its samples in the time-domain. Hence, we expect the $TFDR_{DSSS}\geq 0.5$. On the other hand, a multi-carrier waveform such as OFDM, shows Gaussian amplitude distribution in the time-domain, however a non-Gaussian amplitude distribution in the frequency domain. As a result, we expect that $TFDR_{OFDM}<0.5$. Hence, this method may also be used to determine if the received waveform falls into Class Single-Carrier or Class Multi-Carrier.

B. Multiple Signal Identification

Once it is known that the received waveform belongs to Class Signal, it is useful to find out how many different signal types are present in it. Dogan and Mendel in one of their papers use the tri-spectrum of the received waveform. The tri-spectrum is projected onto 2-Dimensions and sampled to form a matrix. The singular value decomposition (SVD) is then applied to find out the dominant components. Instead of SVD, one may also apply Eigen decomposition or Principal Component Analysis (PCA), if the matrix is square. The number of significant singular or Eigenvalues determines the number of signal types present in the received waveform. A different method is applied here. Instead of tri-spectrum, a compressed spectrogram of the signal. A compressed spectrogram in this application is defined as the spectrogram of the signal-only segments. A spectrogram itself is the result of calculating the frequency spectrum of the windowed frames of a compound signal. If higher computation power is available, then one may use the tri-spectrum instead. Multiple signal identification may be carried out in the time domain or in the frequency domain. If it is carried out the in time domain, then the segments of data/waveform that have been classified as Signal are arranged vertically to form vectors and these vectors are then arranged into columns of a matrix X. On the other hand, multiple signal identification may be carried out in the frequency domain where the compressed spectrogram of the signal-only segments are arranged into the columns of a matrix X. We then take the SVD of this compressed spectrogram and find out the number of dominant singular values which provides us the number of different signal types that are present in the signal. The compressed spectrogram is defined as a spectrogram of only those segments that belong to the Class Signal.

The threshold itself may be computed based on the statistics of various kinds. One of the simple methods of computing such a threshold is to normalize the singular values such that the highest singular value has an amplitude of unity. The number of singular values that exceed some threshold, (e.g. 0.2 or 20%) provides an estimate of the number of signal types that are present and hence multiple signal identification. Various singular values provide an estimate of the strengths of various signals that are present in the mixture.

Figure 3:
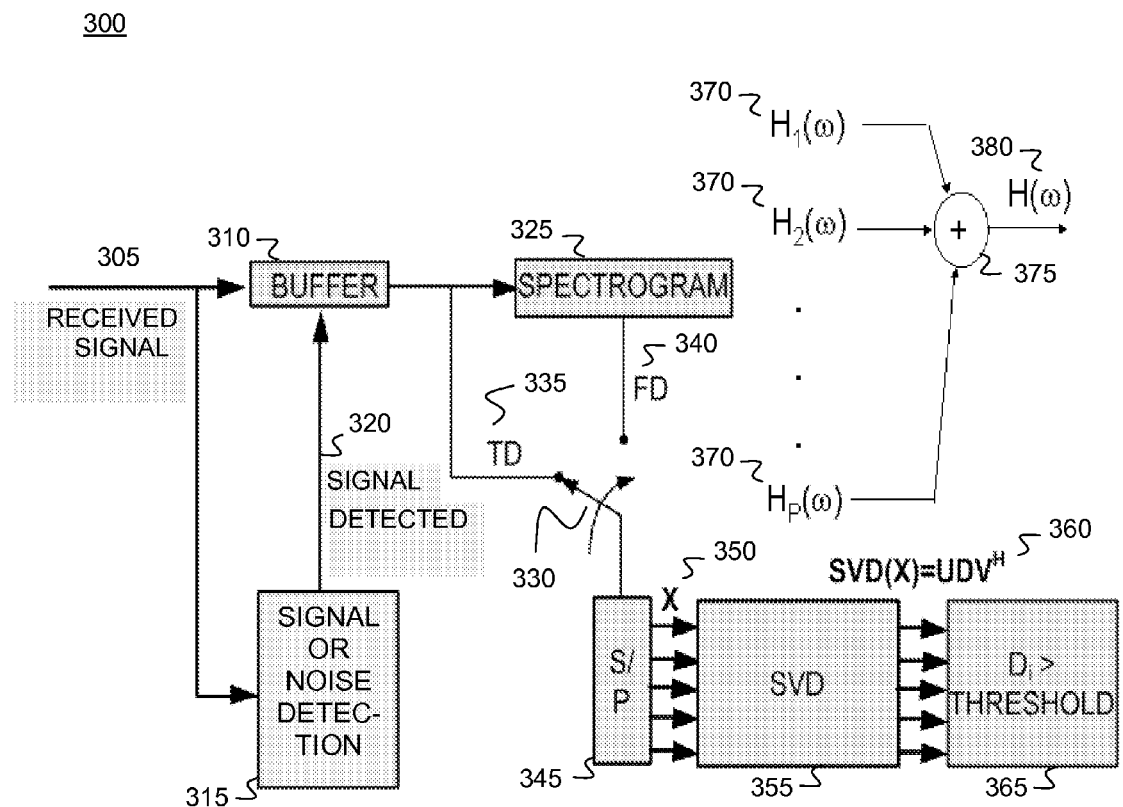
FIG. 3 is a schematic block diagram for identifying the number of signal types in the received signal in accordance with one embodiment.

FIG. 3's schematic block diagram 300 for identifying the number of signal types depicts an embodiment of this. Received signal 305 is applied to buffer 310 and signal or noise detection 315 as also in FIG. 2. The decision from the signal detection stage 320 is used to identify whether a particular segment of the received data/waveform belongs to Class Signal or Class Noise. The segments which have been classified of the type Signal 320 are stored in buffer 310 whose output is input to either a spectrogram 325 or a switch 330 through path 335. Spectrogram 325 output is applied to switch 330, through path 340. Switch 330 is used to select whether the multiple signal identification is carried out in the time domain (TD) or in the frequency domain (FD). As an example, if the TFDR from the signal detection stage is greater than or equal to 0.5, then multiple signal identification is carried out in the TD. Otherwise, it is carried out in the FD. The serial to parallel (S/P) conversion 345 arranges the TD or FD signal-only segments into columns of a Matrix X 350. Hence, Matrix X 350 is a signal-only matrix. Matrix X 350 is then input to a singular value decomposition (SVD) 355 or Principal Component Analysis (PCA) stage. SVD 355 output $SVD(X)=UDV^H$ 360 is in form of three matrices, U, D and V. D is the diagonal matrix whose diagonal elements $D_i$ correspond to the singular values. These singular values $D_i$s are applied to threshold comparison circuit 365. If the singular values $D_i$ are greater than some threshold 365, then they are associated with a signal type. Hence, the number of singular values that exceed some threshold corresponds to the number of different signals types that are present in the received waveforms. FIG. 3 also shows the mechanism of the TD/FD multiple signal identification routine where signals $H_1(\ )$ through $H_p(\ )$ 370 are summed 375 producing signal $H(\ )$ 380. Embodiments of the method try to estimate the number of different signals that constitute $H(\ )$.

C. Finding the Basis Functions for the Received Signal

Basis functions of the received signals can provide important information about the signal itself and what constitutes it. An advantage of finding the basis functions of a signal is that one can then use another set of basis (vectors or functions) which are orthogonal to the basis (vectors or functions) of the original detected signals to constitute a new signal. This new signal will not interfere with the original signal set due to the orthogonality of its basis (vectors or functions). The basis set of a signal may be obtained in time, frequency, space, code, or location. For example, it would be important to know the spreading sequence, given that the received signal is formed using code division multiplexing (CDMA). This type of a signal is also referred to as a direct sequence spread spectrum (DSSS) signal. Given that this CDMA/DSSS signal uses a certain set of codes, one can then find a code set which is orthogonal to the original set to constitute new signals and transmit more information in a given space.

Figure 11:
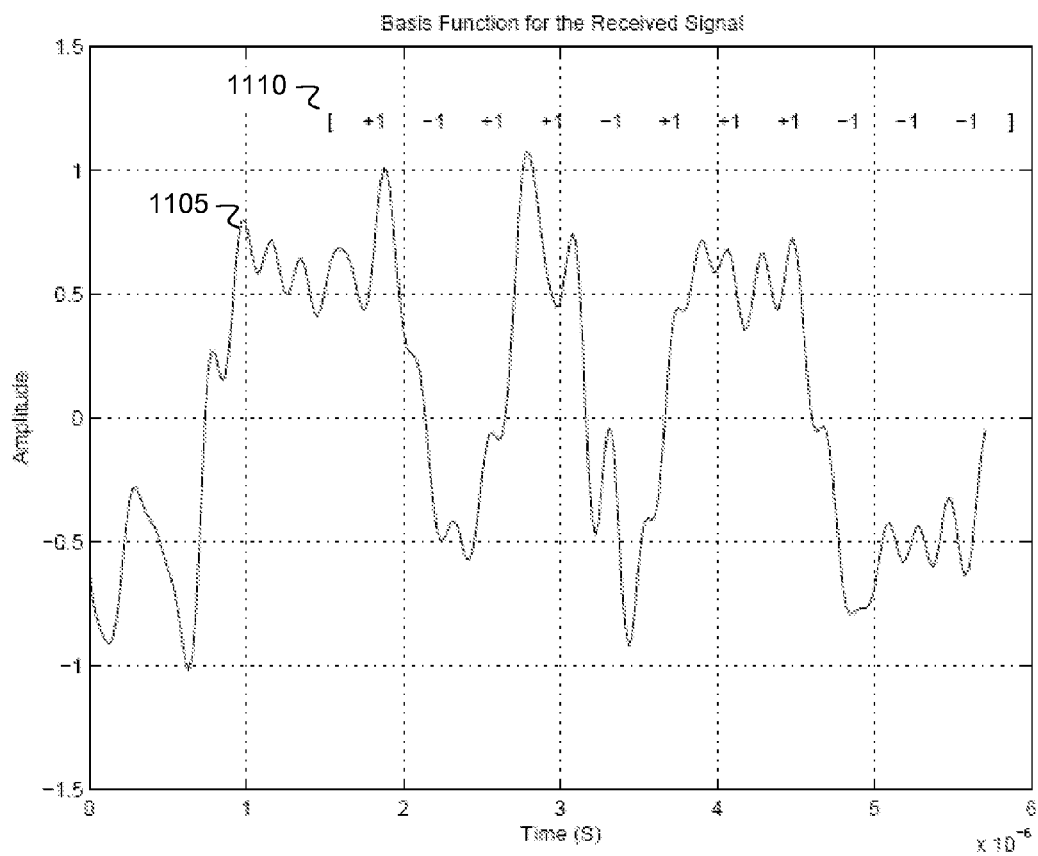
FIG. 11 is a vector corresponding to the first singular value of the SVD of a synchronized signal-only matrix of the over-the-air-collected IEEE 802.11b signal in accordance with one embodiment.

In order to find the basis functions of the received signal, the SVD of the signal-only matrix is obtained. However, rather than choosing the length of the columns of the matrix arbitrarily, some prior synchronization is done on the received waveform to find the underlying periodicity. This estimate $T_{est}$ of the periodicity in the waveform is used to determine the number of samples in each column of a synchronized signal-only matrix X, as also shown in FIG. 11. Then the SVD of this synchronized signal-only matrix X is obtained and the vector U corresponding to various principal singular values determines the basis functions of the received signal. In case Matrix X is a square matrix, one may perform Eigen decomposition. The Eigenvectors corresponding to the principal Eigenvalues determine the basis functions/vectors.

Figure 4:
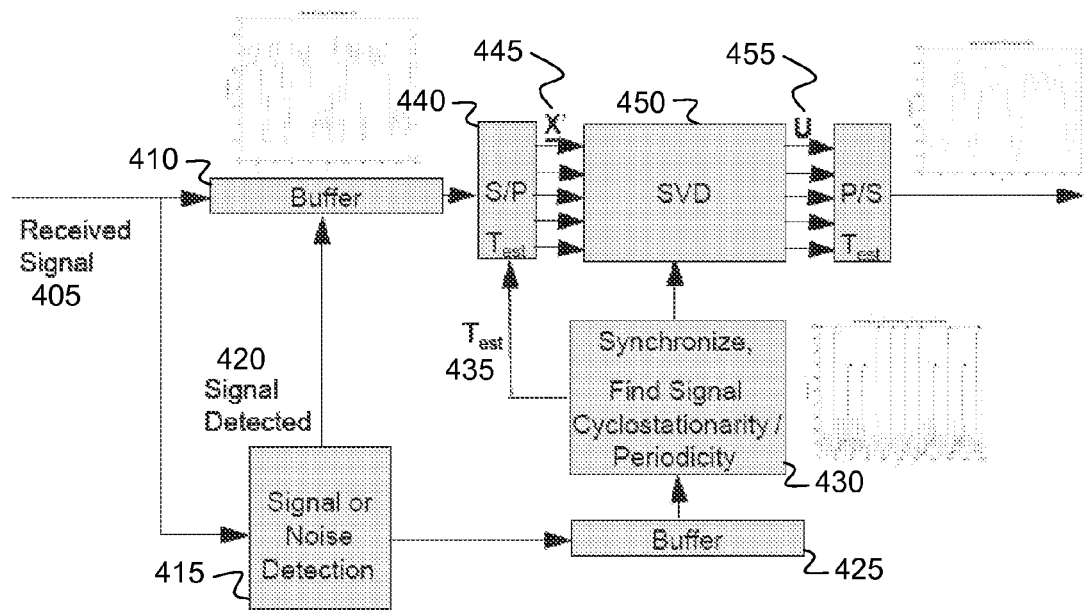
FIG. 4 is a schematic block diagram for finding the basis functions of the received signal in accordance with one embodiment.

FIG. 4 is a schematic block diagram 400 of an embodiment for finding the basis functions of the received signal. Received signal 405 is applied to buffer 410 and signal or noise detection again, as in FIG. 2. The decision 420 from the signal detection stage 415 is used to identify whether a particular segment of the received data/waveform belongs to Class Signal or Class Noise. The segments which have been classified of the type Signal 420 are stored in buffer 410. Signal or noise detection 415 also provides input to buffer 425. Buffer 425 provides input for signal cyclostationarity/periodicity and synchronization 430. The function of finding signal cyclostationarity/periodicity and synchronizing 430 provides an estimate of the periodicity in the waveforms $T_{est}$ 435 to S/P $T_{est}$ 440 and input to singular value decomposition (SVD) 450. The S/P $T_{est}$ 440 provides signal-only matrix X 445 such that the length of its columns corresponds to the periodicity estimate of the waveforms ($T_{est}$). This signal only Matrix X is then input to the SVD 450. SVD 450 provides decomposition of the matrix X into three matrices U, D, and $V^H$, where, as described before, U is a unitary matrix 455 with basis functions of the detected signal as its columns, D is a diagonal matrix whose diagonal elements correspond to the singular values of the of the detected signals, and V is the matrix containing the row space and the null space of Matrix X. The basis (vectors or functions) of the signals of interest are the first k columns of the Matrix U, where 'k' corresponds to the rank of the Matrix X. The parameter 'k' may also be defined as the number of significant non-zero singular values in the Matrix D. Instead of SVD, one may carry out PCA on the Matrix X. The PCA of Matrix X may involve finding the Eigenvalues and the Eigenvectors of Matrix X. The Eigenvectors corresponding to the principal Eigenvalues form the basis (vectors or functions) of the detected signals.

The method and system described above may be typically used for finding the basis (functions or vectors) of the signals of interest in the Time and the Code Domains.

When an SVD is used on the compressed spectrogram of the signal as described previously, then the resultant U matrix contains the basis functions of the received signals in the frequency or spectral domain. Such basis functions in the Frequency Domain can completely re-construct the signals. The basis functions may also be used to learn frequency domain patterns of the signals and re-construct them or create new signals whose spectral content does not co-inside/interfere with the spectral content of the signals that are already present.

Similarly, basis functions of the signals of interest may be found in the space domain (SD) by performing the singular value decomposition (SVD) of the spatial components of the signals, for example received through various antennas and as a result of beam-forming. Basis functions of the signals from one location to the other may be found by simple signal detection and the use of previously described steps.

Summarizing, basis vectors or functions of the detected signals obtained in the time domain (TD), frequency domain (FD), code domain (CD), space domain (SD) and locations domain (LD) as described earlier may be used to either re-construct the signals of interest or to find another set of signals that do not interfere with the signals that are present in the environment, hence improving system efficiency and utilization of resources.

The system and methods described earlier may be used in cognitive communications systems to find a signal set that does not interfere with the existing signal set. They may be used to collect signal information, and they may be used to identify jamming waveforms.

IV. SIMULATION AND EXPERIMENTAL RESULTS

This section explains the simulation and experimental results for embodiments of the signal detection method and its applications.

Figure 5:
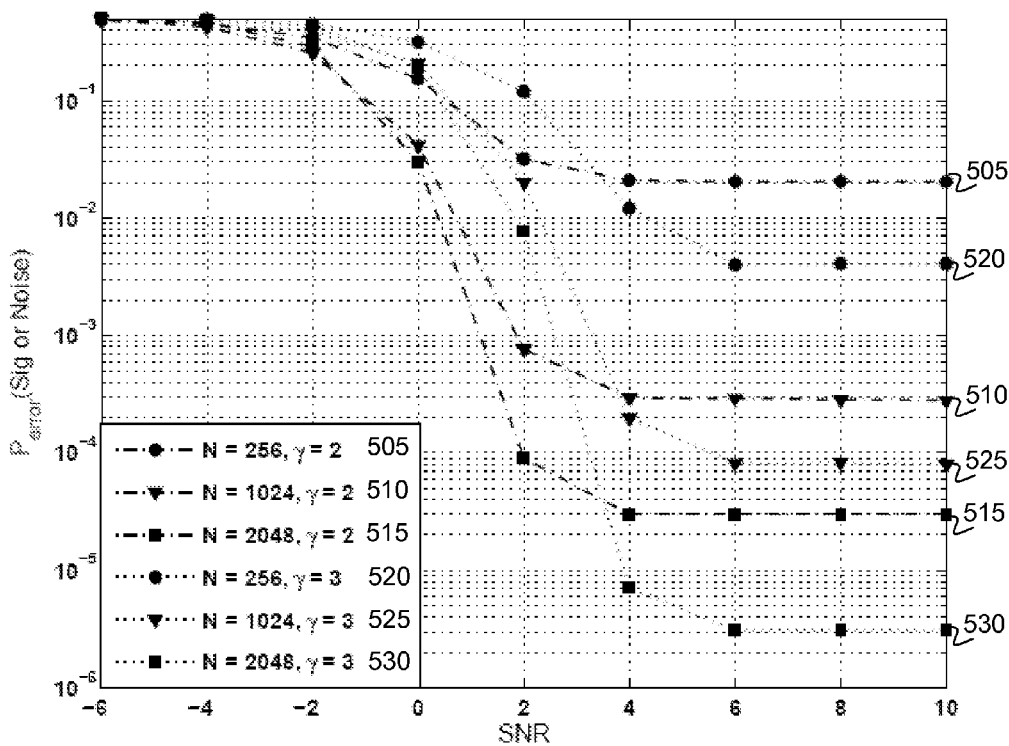
FIG. 5 is a graph showing probability of error in detecting the signal or noise for various values of segment size N and threshold parameter $\gamma$ in accordance with one embodiment.

FIG. 5 shows values for the probability of error in correct classification 500 of a segment of the received waveform versus the average SNR. It depicts the probability of error in detecting the signal or noise for various values of segment size N and threshold parameter coefficient γ. The direct sequence spread spectrum (DSSS) waveforms conforming to the IEEE 802.11b standard were generated and transmitted over an AWGN channel. The chips at the receiver were oversampled by a factor of eight, and an average energy in the received samples for the entire data record was used to compute the signal energy. An appropriate noise was added to the received samples. The figure shows the effect of choosing different segment-lengths (N) and different values of the threshold coefficient γ on the probability of error. Cumulants were calculated up to the 6th order and hence R for this case was 4. The segment length N was chosen to be of a power of 2 in order to efficiently compute its fast Fourier transform (FFT). The larger the value of N, the more accurate are the estimates of the cumulants and lower are the error floors in the probability curves. On the other hand, the value of γ may be used to move the curves sideways. Lower values of γ result in a lower threshold and hence lower $P_D$. Higher values of γ result in higher $P_D$ and lower $P_{FA}$. Values for depicted curves are N=256 and γ=2 505, N=1024 and γ=2 510, N=2048 and γ=2 515, N=256 and γ=3 520, N=1024 and γ=3 525, N=2048 and γ=3 530. Based on the curves obtained, γ=2 was chosen for all experiments for over-the-air-collected test data.

Figure 6:
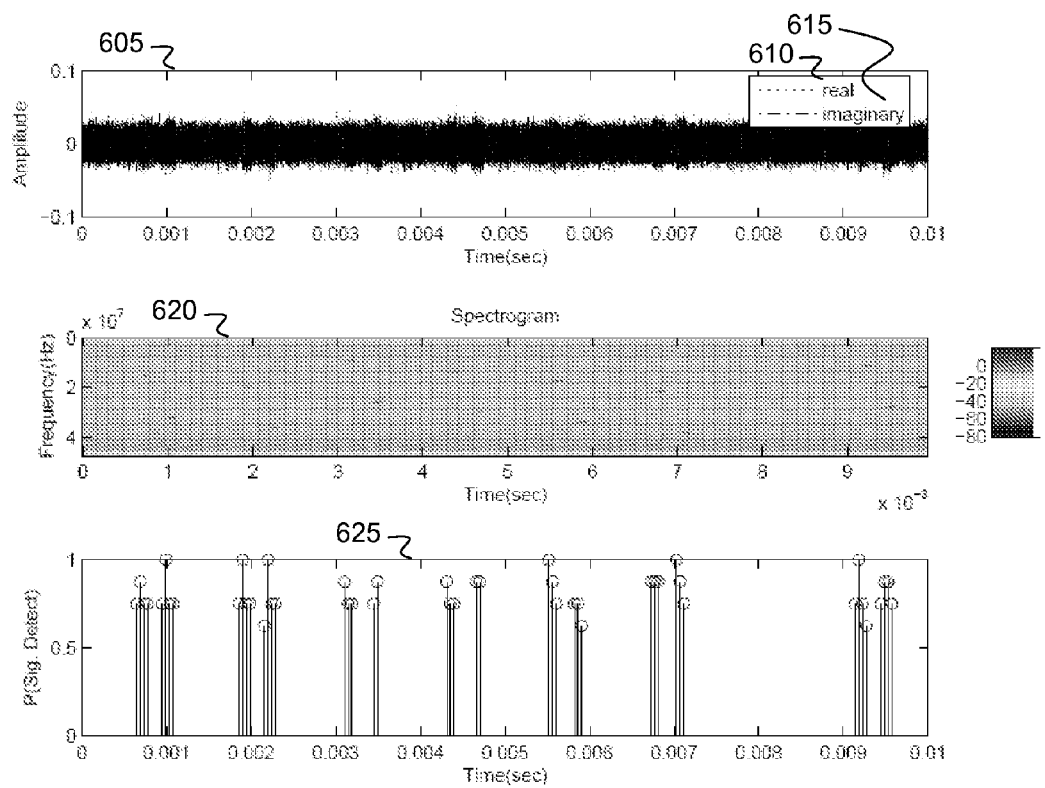
FIG. 6 depicts graphs showing real and imaginary samples of over-the-air-collected transmissions from Bluetooth® devices (top); a spectrogram for the collected samples (middle); and the output of the signal or noise detection method (bottom) in accordance with one embodiment. Bluetooth® is a registered trademark of Bluetooth SIG, Inc. Corporation

FIG. 6 shows the performance 600 of the signal or noise detection method on a narrow-band, narrow-pulse frequency-hopping waveform such as Bluetooth® for personal area networks (PAN) collected using an Agilent 89640 signal analyzer in a trailer located in a facility parking lot using a sampling frequency of 47.499 MHz. The Bluetooth® devices were kept at an approximate distance of 5 meters from the signal analyzer and inexpensive isotropic antennas were used to receive the signals. The segment-length (N) was chosen to be 2048 samples, which was equivalent to approximately 43.11 μS (microseconds) of data to estimate the higher order cumulants. The FFT block length was also chosen to be of the same size as the segment length. Upper display 605 shows the real 610 and imaginary 615 data for a window of 10 mS. As can be seen, the signals are weak and hardly visible. The display in the middle shows the spectrogram 620 and hence the time frequency distribution (TFD) of the collected signal and the bottom FIG. 625 shows the results of applying an embodiment of the signal or noise detection method with the term γ set at 2.

Figure 7:
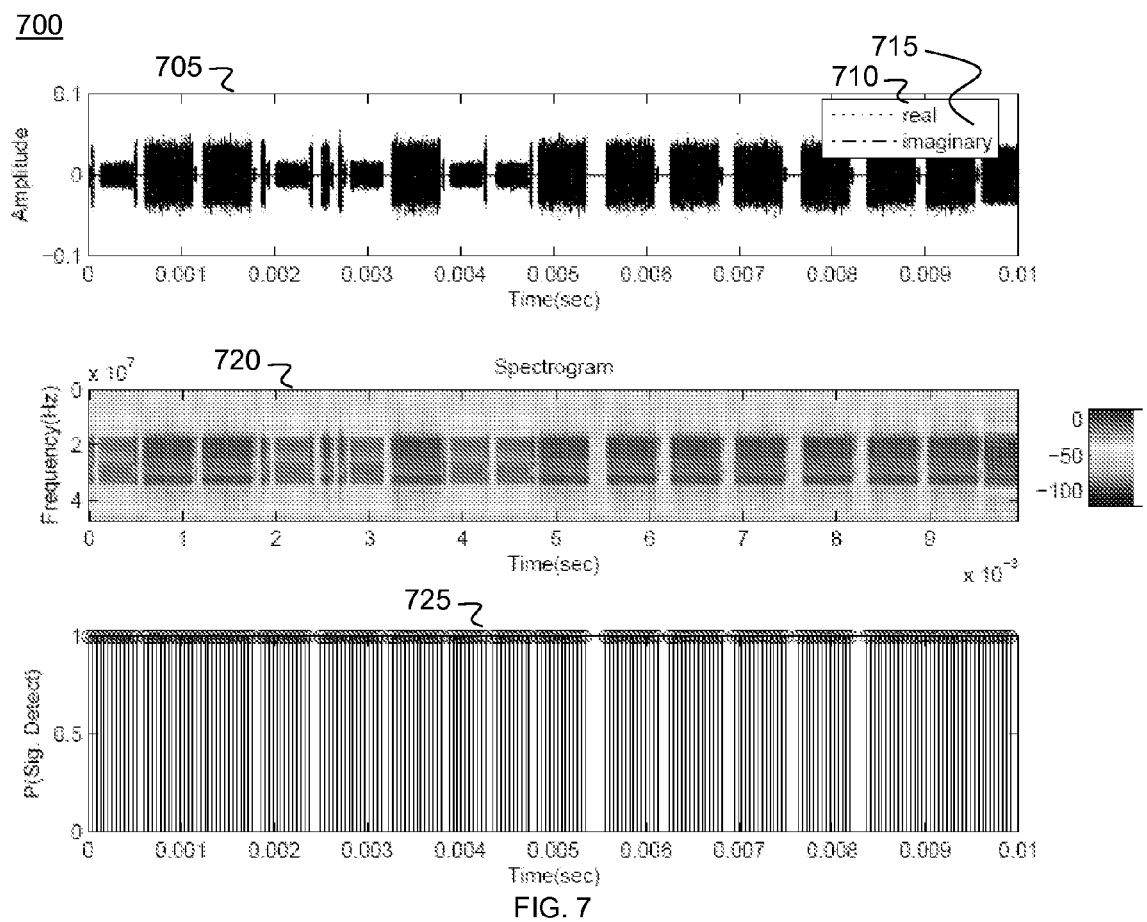
FIG. 7 depicts graphs showing real and imaginary components of the over-the-air-collected transmissions from IEEE 802.11g devices (top); a spectrogram for the collected samples (middle); and the output of the signal or noise detection method (bottom) in accordance with one embodiment.

FIG. 7 shows the same performance 700 for an orthogonal frequency division multiplexed (OFDM) type of a received waveform that belongs to the devices conforming to the IEEE 802.11g Standard. Upper display 705 shows the real 710 and imaginary 715 data for a window of 10 mS. The display in the middle shows the spectrogram 720 and the time frequency distribution (TFD) of the collected signal and the bottom FIG. 725 again shows the results of applying an embodiment of the signal or noise detection method with the term γ set at 2.

Figure 8:
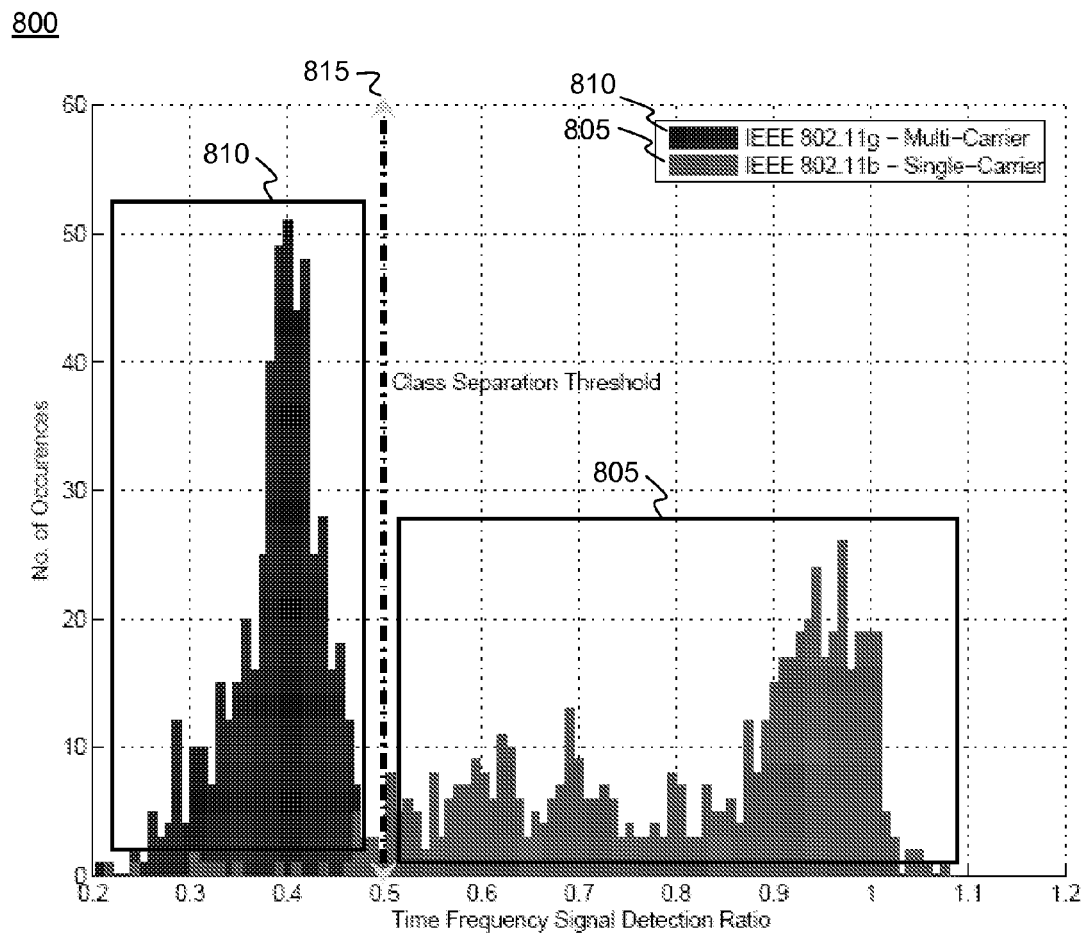
FIG. 8 is a graph showing distribution of the time frequency detection ratio of the over-the-air-collected waveforms belonging to IEEE 802.11b (DSSS) and IEEE 802.11g Orthogonal Frequency Division Multiplexing (OFDM) waveform types in accordance with one embodiment.

FIG. 8 shows the time frequency detection ratio (TFDR) statistics 800 for IEEE 802.11b waveforms 805 using single-carrier transmission and IEEE 802.11g waveforms 810 using orthogonal frequency division multiplexing OFDM. TFDR is computed by first dividing the received waveform into 10 mS frames and further dividing each frame into segments of N=2048 samples each. Next, the number of segments detected in the time domain is found versus the number detected in the frequency domain for each frame. The threshold 815 for the class separation was set at 0.5. Based on the over the air collected test data, the IEEE 802.11b frames of 10 mS each were classified as multi-carrier 13 out of 518 times and the IEEE 802.11g frames of the same length were classified as single-carrier 25 out of 565 times. Hence, the net probability of error was approximately 3.5%.

Figure 9:
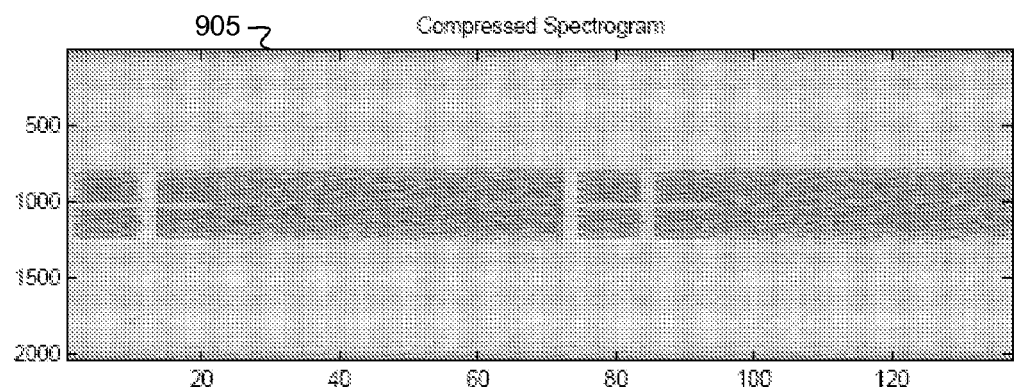
FIG. 9 is a compressed spectrogram of the IEEE 802.11b and its singular value distribution in accordance with one embodiment.
Figure 9:
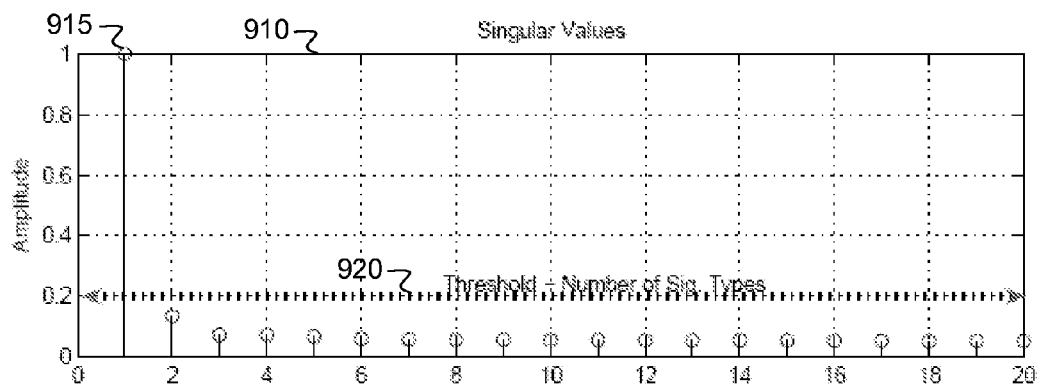
Figure 10:
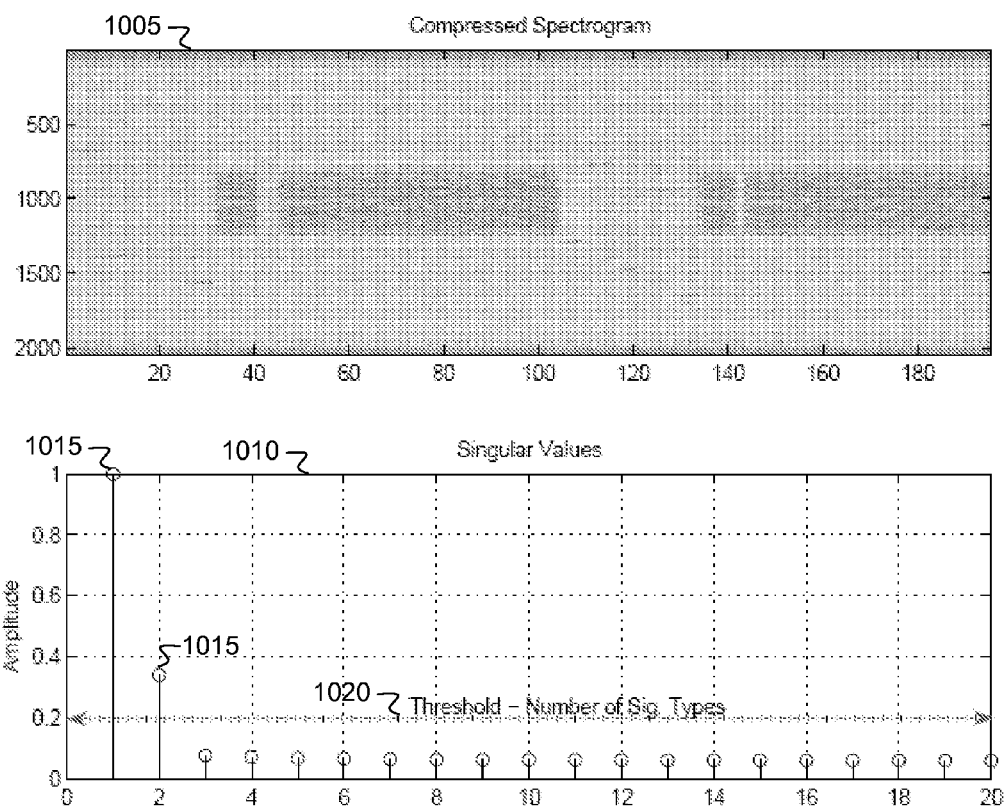
FIG. 10 is a compressed spectrogram of the IEEE 802.11b and the Bluetooth® waveforms added together and its singular value distribution in accordance with one embodiment.

FIGS. 9 and 10 show the results for identifying the number of signal types in the received waveforms as explained in Section III-B, Applications of Signal Detection Methods, Multiple Signal Identification. Based on embodiments of the detection method, the segments that are identified to contain useful signals are concatenated to form a signal-only vector, and its spectrogram is taken to obtain a 2-D matrix X. The SVD of this compressed spectrogram gives the singular value distribution and the number of dominant singular values determines the number of possible signal types.

FIG. 9 shows an IEEE 802.11b signal's 900 compressed spectrogram 905 and the singular value distribution 910 resulting in the identification of only one signal 915. Threshold 920 was set at 0.2.

FIG. 10 on the other hand, shows 1000 the compressed spectrogram 1005 of IEEE 802.11b and Bluetooth® waveforms added together and its singular value distribution 1010 which results in the identification of two signal types 1015. Threshold 1020 was also set at 0.2.

Finally, FIG. 11 shows the results 1100 of identifying the basis functions for the received signal as explained in Section III-C, Applications of Signal Detection Methods, Finding the Basis Functions for the Received Signal. The over the air collected IEEE 802.11b waveforms were used to find the basis function. The waveform 1105 shown corresponds to the first singular value of SVD of the time-synchronized signal-only matrix. The IEEE 802.11b waveforms use the spreading sequence given by [+1 −1 +1 +1 −1 +1 +1 +1 −1 −1 −1] 1110 and, as can be seen in the figure, this spreading sequence can be clearly identified as an output of finding the basis functions algorithms.

V. Conclusions

This method detects a broad class of signals in Gaussian noise using higher order statistics. The method is able to detect a number of signal types. In a typical setting, this method provided an error rate of 3% at a signal to noise ratio of 0 dB. This method gave the time frequency detection ratio used to determine whether the detected signal fell in Class Single-Carrier of Class Multi-Carrier. Additionally, applications were shown such as signal identification and finding the basis functions of received signals.

The method has the advantages of being both simple and efficient. Instead of needing the tri-spectrum of the received signal, which is a cumbersome task, this technique uses the spectrogram of the signal-only segments, which is much more easily computable. Additionally, synchronization of the received signal ensures accurate alignment of the columns in the SVD, resulting in an improved estimation of the basis functions of the received signals.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for signal identification comprising the steps of: receiving a single, non-parallel waveform with no fixed preprocessing; converting said waveform to time samples; dividing said waveform time samples into segments; detecting at least one signal for each of said segments; classifying said segments as belonging to signal or noise; identifying a plurality of signals detected based on singular value decomposition (SVD) of a specific arrangement of signal-only segments; and identifying said at least one signal wherein vectors corresponding to dominant singular values of said at least one received signal correspond to basis functions, said basis functions designating signal type, wherein finding said basis functions of said at least one signal comprises: subjecting a time-synchronized matrix to a second singular value decomposition (SVD), producing a matrix whose diagonal elements correspond to singular values of said at least one signal and columns of U output matrix correspond to basis vectors of said at least one detected signal.

2. The method of claim 1, wherein said time samples are digital.

3. The method of claim 1, wherein said time samples are discrete.

4. The method of claim 1, wherein said method of detecting at least one signal is selected from the group consisting of: energy detection, spectral correlation, cyclo-stationarity check, and application of higher order statistics.

5. The method of claim 1, wherein said step of detecting at least one signal comprises detecting said at least one signal when in a form selected from the group consisting of: analog, digital, discrete time, and complex.

6. The method of claim 1, wherein said step of detecting at least one signal comprises: dividing said received waveform into real and imaginary components and detecting said real components and said imaginary components separately.

7. The method of claim 1, wherein said step of detecting at least one signal comprises detecting said at least one signal in a band selected from the group consisting of: base and pass.

8. The method of claim 1, wherein said step of detecting at least one signal comprises: obtaining a compressed spectrogram of signal-only segments of said received waveform.

9. The method of claim 8, wherein said step of detecting at least one signal further comprises: taking a first singular value decomposition (SVD) of said compressed spectrogram to obtain a singular value distribution, whereby a number of dominant singular values determines a number of signals present in said received waveform.

10. The method of claim 8, wherein said step of detecting at least one signal further comprises: performing principal component analysis (PCA) of SVD, whereby a number of dominant Eigenvalues determines a number of signals present in said received waveform.

11. The method of claim 1 wherein finding said basis functions of at least one signal comprises: subjecting a time-synchronized matrix to a second principal component analysis (PCA), producing a matrix whose diagonal elements correspond to Eigenvalues of said at least one detected signal and columns of an other output matrix correspond to basis vectors of said at least one detected signal.

12. The method of claim 1, wherein said step of identifying at least one signal comprises a threshold derived from normalized singular values such that the highest singular value has an amplitude of unity.

13. The method of claim 1, wherein said basis functions are determined by estimating cyclostationarity of said received waveform and forming columns of signal-only segments such that a length of each column is equal to an estimated time period, forming a time-synchronized matrix of signal-only segments.

14. The method of claim 1 comprising a time frequency detection ratio (TFDR) whereby it is determined whether said at least one signal is single-carrier or multi-carrier.

15. The method of claim 14, wherein identification of types of signals uses a compressed spectrogram based on said TFDR carried out in domains selected from the group consisting of: time (TD) and frequency (FD).

16. The method of claim 1 wherein said signal type comprises: base-band, pass-band, single-carrier, multi-carrier, frequency-hopping, broadband, narrow-band, broad-pulse, and narrow-pulse.

17. The method of claim 1 wherein basis functions in the frequency domain (FD) are used to re-construct said at least one signal.

18. The method of claim 1 wherein basis functions in the frequency domain (FD) are used to learn frequency domain patterns of said at least one signal and re-construct them.

19. The method of claim 1 wherein basis functions in the frequency domain (FD) are used to learn frequency domain patterns of said at least one signal and create new signals whose spectral content does not interfere with spectral content of said at least one signal.

20. The method of claim 1 wherein basis functions of said at least one signal are obtained in the space domain by performing a singular value decomposition (SVD) of spatial components of said at least one signal.

21. The method in claim 1 wherein identification of said basis functions of said at least one signal in the location domain (LD) consists of detection of said at least one signal at a particular location followed by subjecting a time-synchronized matrix of signal-only segments to singular value decomposition (SVD).

22. The method of claim 1 wherein said basis functions of said at least one signal are obtained in a domain of the group consisting of: time (TD), code (CD), space (SD), location (LD), and frequency.

23. The method of claim 22 wherein said basis functions of said at least one signal obtained in the frequency domain (FD) use a compressed spectrogram.

24. The method of claim 22 wherein said basis functions are used to re-construct said at least one signal.

25. The system of claim 22 wherein said basis functions are used to find another set of signals that do not interfere with signals that are present in the environment.

26. A wireless communication system comprising: a signal detection module wherein signals are detected; wherein said signal detection module receives a single, non-parallel waveform with no fixed preprocessing; converts said waveform to time samples; divides said waveform time samples into segments; detects at least one signal for each of said segments; classifies said segments as belonging to signal or noise; and a signal identification module whereby basis functions of said detected signals are determined; wherein said signal identification module identifies a plurality of signals detected based on singular value decomposition (SVD) of a specific arrangement of signal-only segments; and identifies said at least one signal wherein vectors corresponding to dominant singular values of said at least one received signal correspond to basis functions, said basis functions designating signal type, wherein said signal identification module subjects a time-synchronized matrix to a second singular value decomposition (SVD), producing a matrix whose diagonal elements correspond to singular values of a detected signal.

27. The system of claim 26, wherein said signal detection module method of detection is selected from the group consisting of: energy detection, spectral correlation, cyclo-stationarity checking, and application of higher order statistics.

28. The system of claim 26, wherein said signal detection module divides a detected signal into real and imaginary components and detects said real components and said imaginary components separately.

29. The system of claim 26, wherein said signal detection module obtains a compressed spectrogram of signal-only segments of a detected signal.

30. The system of claim 29, wherein a first singular value decomposition (SVD) of said compressed spectrogram is taken to obtain a singular value distribution, whereby a number of dominant singular values determines a number of signals present in a received signal.

31. The system of claim 29, wherein a first Eigenvalue decomposition through principal component analysis (PCA) of said compressed spectrogram is taken to obtain an Eigenvalue distribution, whereby a number of dominant Eigenvalues determines a number of signals present in a received signal.

32. The system of claim 26 wherein said signal identification module subjects a time-synchronized matrix to a second principal component analysis (PCA), producing a matrix whose diagonal elements correspond to Eigenvalues of a detected signal.

33. The system of claim 26, wherein said signal identification module comprises a threshold derived from normalized singular values such that the highest singular value has an amplitude of unity.

34. The system of claim 26, wherein basis functions are determined by estimating cyclostationarity and forming columns of signal-only segments such that a length of each column is equal to an estimated time period.

35. The system of claim 26 comprising a cognitive radio.

36. A non-transitory computer-readable medium having computer-readable signals stored thereon that define instructions that, as a result of being executed by a computer, instruct said computer to perform a method of receiving communications identifying multiple communication signals and signal basis functions, the method comprising:
    receiving a signal;
    obtaining a compressed spectrogram of said received signal;
    obtaining a first singular value distribution (SVD) of said compressed spectrogram;
    determining a number of dominant singular values from said first SVD;
    identifying a number of signals present in said received signal from said number of dominant singular values;
    finding signal-only segments of said received signal;
    estimating cyclostationarity inherent within said signal-only segments;
    forming time-synchronized signal-only columns of said signal-only segments wherein a length of each column is equal to said signal-only column's estimated time period;
    forming a time-synchronized matrix of said time-synchronized signal-only columns;
    subjecting said time-synchronized matrix to a second SVD; and
    obtaining basis functions of said received signal from said second SVD of said time-synchronized matrix, said basis functions corresponding to said number of dominant singular values whereby signal types are identified.

* * * * *